United States Patent [19]
Traut et al.

[11] Patent Number: 5,787,217
[45] Date of Patent: Jul. 28, 1998

[54] FIBER OPTIC GROUND WIRE CABLE

[75] Inventors: Richard T. Traut, Madbury; Gregory N. Fontaine, Rye, both of N.H.

[73] Assignee: Simplex Technologies, Inc., Newington, N.H.

[21] Appl. No.: 601,677

[22] Filed: Feb. 15, 1996

[51] Int. Cl.[6] .................................................. G02B 6/44
[52] U.S. Cl. ..................... 385/106; 385/100; 385/107; 385/102; 385/114; 385/105; 385/101
[58] Field of Search ............................... 385/100, 101, 385/102, 103, 105, 106, 107, 109, 110, 112, 113, 114, 115, 141

[56] References Cited

U.S. PATENT DOCUMENTS

| | | | |
|---|---|---|---|
| 3,955,878 | 5/1976 | Nowak | 385/100 X |
| 4,359,598 | 11/1982 | Dey et al. | 174/40 |
| 4,388,800 | 6/1983 | Trezeguet et al. | 57/7 |
| 4,389,088 | 6/1983 | Trezequet | 385/100 X |
| 4,416,508 | 11/1983 | Dey et al. | 385/100 X |
| 4,422,718 | 12/1983 | Nakagome et al. | 385/109 X |
| 4,484,963 | 11/1984 | Anctil et al. | 156/56 |
| 4,491,386 | 1/1985 | Negishi et al. | 385/100 X |
| 4,494,822 | 1/1985 | Harvey | 385/100 X |
| 4,522,464 | 6/1985 | Thompson et al. | 385/100 X |
| 4,523,804 | 6/1985 | Thompson | 385/100 X |
| 4,606,604 | 8/1986 | Soodak | 385/100 X |
| 4,630,887 | 12/1986 | Taylor | 385/100 X |
| 4,632,506 | 12/1986 | Taylor | 385/100 X |
| 4,651,917 | 3/1987 | Gould et al. | 385/109 X |
| 4,666,244 | 5/1987 | Van Der Velde et al. | 385/109 X |
| 4,676,590 | 6/1987 | Priaroggia | 385/100 X |
| 4,944,570 | 7/1990 | Oglesby et al. | 385/100 X |
| 5,109,456 | 4/1992 | Sano et al. | 385/100 |
| 5,195,158 | 3/1993 | Bottoms, Jr. et al. | 385/105 |
| 5,204,926 | 4/1993 | Bottoms, Jr. et al. | 385/105 |
| 5,208,890 | 5/1993 | Kohler et al. | 385/115 |
| 5,268,983 | 12/1993 | Tatarka et al. | 385/106 |
| 5,274,725 | 12/1993 | Bottoms, Jr. et al. | 385/105 |
| 5,336,883 | 8/1994 | Hobby et al. | 250/227.11 X |
| 5,343,549 | 8/1994 | Nave et al. | 385/103 |
| 5,371,825 | 12/1994 | Traut | 385/109 |
| 5,524,164 | 6/1996 | Hattori et al. | 385/114 |

OTHER PUBLICATIONS

IEEE Power Engineering Society; IEEE Standard Construction of Composite Fiber Optic Overhead Ground Wire (OPGW) for Use on Electric Utility Power Lines; Oct. 7, 1994; pp. 1–30; IEEE, Inc.

*Primary Examiner*—Brian Healy
*Attorney, Agent, or Firm*—Hayes, Soloway, Hennessey, Grossman & Hage, P.C.

[57] ABSTRACT

A fiber optic cable core structure has a plurality of fiber optic mini-bundles, each of which includes a plurality of optical fibers bonded together in a first curable material. The fiber optic mini-bundles in turn are bonded together as a unitary structure by a second curable material, and the resulting structure is wrapped in a metal tube-like ring.

34 Claims, 4 Drawing Sheets

FIBER OPTIC GROUND WIRE CABLE

TECHNICAL FIELD

The present invention relates generally to fiber optic cables. The invention has particular utility in connection with groundwire cables for use with overhead power transmission lines, and will be described in connection with such utility, although other utilities are contemplated, e.g. for use within submarine cable.

BACKGROUND OF THE INVENTION

An electrical power transmission network typically comprises an electrical power lo generation source that is connected to an electrical power distribution network by overhead electrically conductive cables suspended between spaced-apart support towers that are installed along electric utility right-of-ways. These electrically conductive cables are susceptible to lightning strikes because of the conductive characteristic of the cabling and the height of the support towers. Cables called "groundwires" are typically suspended between the spaced-apart support towers and above the base electrical conductors of the power transmission network to protect from the high current and voltage surges presented by direct or near-by lightning strikes. These groundwires also called shield wires or earth wires, provide a path for the high current and voltage transients generated by lightning strikes within the proximity of the groundwire to safely discharge via the groundwire, the local support towers, and the ground. The ground wire, since it is directly connected into the transmission system grounding network, is also required to carry transient short circuit high AC currents such as those that occur during a system phase-to-phase fault.

The electric utility right-of-ways for overhead electrical power transmission lines often provide an attractive path for the installation of overhead telecommunications cables. Because the communications content of light signals carried by optical fibers are not affected by the high voltage and current environment typically found within an electrical power transmission network, groundwire cables are often combined with an optical fiber or, more often, a bundle of optical fibers, to efficiently provide lightwave communications via the existing overhead transmission network. More specifically, a bundle of optical fibers are typically mounted within an electrical conductor to form a groundwire cable that is installed between spaced-apart support towers and above the electrical transmission lines. In this manner, the groundwire cable functions as both a groundwire and a telecommunications cable and thereby enables the existing electric utility right-of-way to be used for telecommunications.

A dual-purpose groundwire cable, which provides both ground fault protection and a telecommunications link must be tolerant of the high tensional and vibrational forces is presented by the overhead cable installation. More specifically, both the electrical conductor and, the bundle of optical fibers provided by the dual-purpose groundwire must be capable of withstanding the stresses presented by the overhead groundwire cable installation. Optical fibers always contain defects, known as flaws, that are not directly detectable by the manufacturer. The flaws can lead to communications-interrupting fiber breaks upon the application of sufficient strain on the fiber. To prevent this possibility, 100% of the fiber, and any fiber splices, are proof-tested to a tensile stress sufficiently high to ensure that all significant flaws are detected and removed from production fiber.

Conventional dual-purpose groundwires provide some form of a mechanical mechanism to decouple the conductor strain from the optical fiber strain to relieve any potential optical fiber-damaging stresses during and after installation of the groundwire. In addition, the groundwire cable also must be capable of withstanding the fault currents provided by lightning strikes and short circuits and the hazards provided by weather extremes, including ice, wind, rain and temperature extremes.

Attempts have been made in the art to protect fibers from tensile stresses by simply twisting them into helixes thus increasing their lengths relative to the cable lengths. U.S. Pat. Nos. 3,955,878, 4,388,800, 4,389,088 and 4,491,386 are examples of this approach. Typically, single fibers are laid directly into helical channels in the cable core so that when the cables are stretched, the extra length of the fibers prevents transmission of cable elongation to the fibers. However, in all of these patents the fibers are free to move relative to the core of the cable, and must include slight excess fiber length or slack.

Another known cable that provides both an electrically conducting ground or static wire and a fiber optic cable is described in U.S. Pat. No. 4,944,570 to Oglesby et al. This cable includes a central core that has one or more helical channels of a given twist direction or lay formed in the periphery of the core. One or more tubes containing a suitable dielectric water-blocking compound and optical fibers are positioned in the helical channels, one tube per channel. The water-blocking compound is flexible and helps to maintain the position of the fibers in the tube, but allows the fibers to move. The fibers, one or more per tube, are randomly arranged within the tubes and the tubes, the fibers and the channels are arranged in such a way that stresses from cable elongation less than a predetermined value are not transmitted to them, thus providing an elongation window. Finally, the assembly formed of the core and the tube or tubes is wrapped with metal wires.

Other dual-purpose groundwire cables are described in U.S. Pat. Nos. RE 32,293 and 32,374 to Dey et al. Several embodiments of the cable in these patents include at least one stranded layer of elongate elements of metal or metal alloy, at least one elongate compartment within and extending throughout the length of the stranded body and loosely housed in the elongate compartment, at least one separate optical fiber and/or at least one optical bundle.

As in other known approaches to reducing stress on the optical fibers, the fibers in the Dey et al patents are free to move within the compartment. A greasy material fills the interstices between the stranded layer elements to provide for relative sliding movement between stranded layers and to prevent water from entering the interior of the cable.

In the known fiber optical groundwire cables where the fibers are loosely housed and/or otherwise free to move, the strain that may be imposed upon the installed groundwire conductor is mechanically decoupled from the strain upon the supported fiber optic cable because the fiber optical cable is loosely housed within the cable core; specifically limited relative movement between the fiber optic cable and the groundwire body can occur upon the application of tensional forces along the groundwire cable. Also, many prior art groundwire cables include a filling compound that surrounds the fiber optic cable mounted within the channel but allows the fiber optic cable to move relative to the groundwire electrical conductor.

Despite the mechanisms provided in the prior art for decoupling the electrical conductor strain from the optical fiber strain, the tensional and vibrational forces upon the typical cable limits the estimated expected lifetime of the optical fibers that form the fiber optic cable within the electrical conductor. Also, the dual-purpose groundwire cables provided by the prior art are also limited by the maximum number of optical fibers carried by the cable because of the loose positioning of the fibers within the electrical conductor-lo the provision of space for movement limits the number of optical fibers that can be present.

Many optical fibers used for telecommunications today are manufactured with a coating of acrylate to fill microcracks in the glass fibers formed during drawing, prevent the incursion of moisture, and provide protection to the glass. The acrylate coating on most is fibers is extremely thin and provides little or no cushioning from chafing or from compressive forces generated by contact with adjacent fibers in a bundle or with the surfaces of a channel.

The above discussion of the prior art is taken largely from U.S. Pat. No. 5,195,158 to Bottoms et al who proposed a dual-purpose fiber optic groundwire that includes an electrically conductive core which contains at least one grooved channel that is helically wound along the length of the core conductor. Bottoms et al also provides a strain jacket firmly affixed within each channel such that the strain jacket is positioned completely within the channel. Each strain jacket tightly binds a plurality or bundle of optical fibers and reportedly protects the optical fibers from weather exposure. Bottoms et al also provides at least one layer of stranded electrical conductors which encloses the core conductor and bears the axial strain of the cable when supported whereby to provide current carrying capability for the cable and additional protection for the bundle of optical fibers from ice, wind and rain. However, Bottoms et al's strain jacket complicates manufacturing, and thus adds to manufacturing costs.

It is thus an object of the present invention to provide an improved fiber optic cable which overcomes the aforesaid and other disadvantages of the prior art. A more specific object is to provide an improved dual-purpose, i.e. fiber optic groundwire cable or fiber optic cable for use within submarine cable characterized by enhanced environmental protection and reliability.

SUMMARY OF THE INVENTION

The present invention overcomes the aforesaid and other technical problems and disadvantages of the prior art by employing in a fiber optic cable assembly at least one mini-bundle of optical fibers bound together by a first curable material. The mini-bundle is arranged with other mini-bundles to form fiber optic cables of varying fiber count, and the mini-bundles preferably are cured in place with a second curable material, which may be the same or different from the first curable material, to form a unitary structure. The resulting fiber optic containing unitary structure, or one or a plurality of mini-bundles, are combined with conventional cable fill and strain elements to form an overhead fiber optic groundwire cable or a submarine fiber optic cable.

BRIEF DESCRIPTION OF THE DRAWINGS

The foregoing and other objects of the present invention may be more clearly understood and appreciated from the following detailed description of the present invention, taken with reference to the attached drawings, wherein like numerals depict like parts, and wherein.

DETAILED DESCRIPTION OF THE PREFERRED EMBODIMENTS

Figure 1:
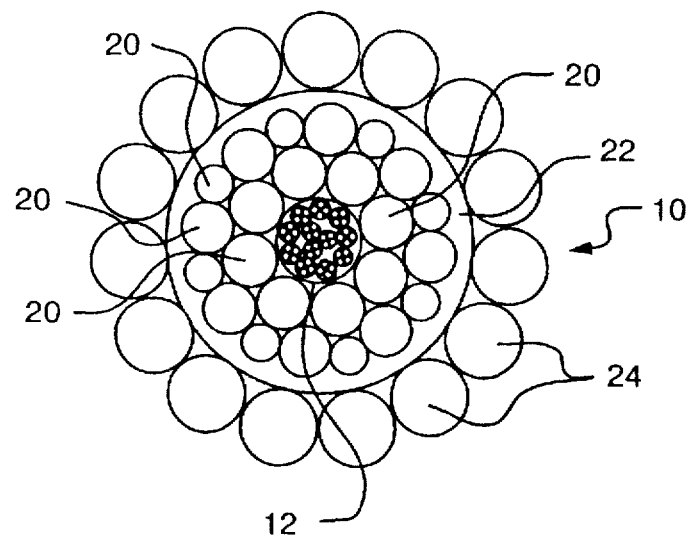
FIG. 1 is a cross-sectional view of a fiber optic cable assembly constructed in accordance with a preferred embodiment of the present invention.
Figure 2:
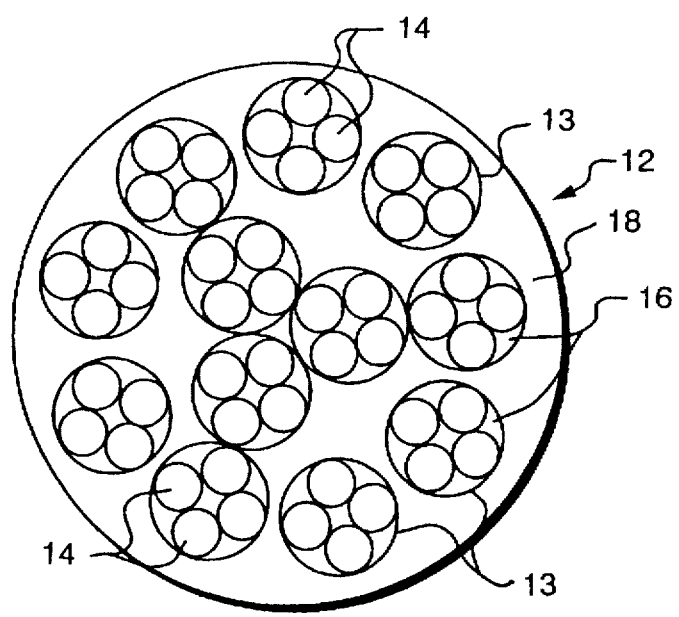
FIG. 2 is a view, similar to FIG. 1, and illustrating, in an enlarged scale, the interior portion of the fiber optic cable of FIG. 1.

Referring first to FIGS. 1 and 2, a fiber optic cable assembly 10 comprises an optical fiber core structure 12 consisting of a plurality of mini-bundles 13 of optical fibers 14 in a cloverleaf arrangement bound together as a unitary structure in a first curable material such as a UV-curable or cross-linking polymerizable material 16. As seen in FIGS. 1 and 2, each mini-bundle 13 comprises four optical fibers 14. The mini-bundles in turn are arranged in a core assembly of three mini-bundles 13 peripherally surrounded by nine mini-bundles 13 which together provide a total of 48 optical fibers 14. The mini-bundles 13 in turn are bound together as a unitary structure by means of a second curable material 18 which may be the same as or different from the curable material 16 forming the minibundles. In a preferred embodiment of the invention, curable materials 16 and 18 comprise the same material, such as a UV-curable acrylate.

Referring again to FIG. 1, the unitary optical fiber core structure 12 is surrounded, in a conventional manner, by high tension metal or metal alloy strength members, preferably steel wires 20. Steel is preferred over, e.g. aluminum, as is conventionally used in prior art ground wire cables, since the resulting structure is more resistant to creep. In order to facilitate tight packing and create crush resistance in a self-supporting package, three different diameters of high tension steel wires 20, are employed. Typically, but not necessarily, wires 20 are helically wound around the unitary core structure 12. Moving radially outward, the steel wires 20 in turn are encased within a metal or metal alloy tube 22 which hermetically seals the fiber core structure and binds high tension wires 20. Tube 22 may be, e.g. copper or copper alloy when the cable is used within submarine cable, or aluminum, in the case of terrestrial ground wire. Moving outward radially, a plurality of metal or metal alloy wires 24, preferably aluminum and/or aluminum-clad steel, and preferably helically wound, surround tube 22.

Figure 3:
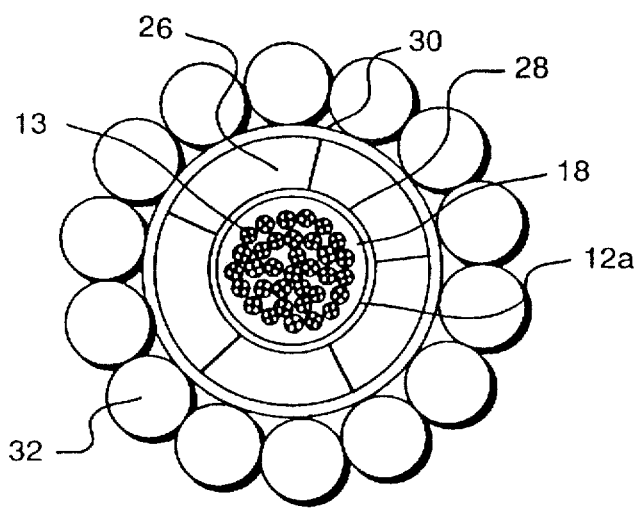
FIG. 3 is a view, similar to FIG. 1, and illustrating an alternative embodiment of fiber optic cable constructed in accordance with the present invention.

Referring to FIG. 3, there is shown an alternative embodiment of fiber optic cable assembly made in accordance with the present invention. In the FIG. 3 embodiment, six mini-bundles 13 comprising four optical fibers each in a cloverleaf arrangement in a curable material as before, are surrounded by two rings comprising, respectively twelve and eighteen mini-bundles 13. The mini-bundles 13 are then bound together into a single unitary fiber structure by means of a curable material 18 to form a unitary fibercore structure 12a.

Continuing radially outward, the resulting unitary fiber core structure 12a is surrounded by high-tension metal strength members which, in this embodiment comprise a plurality of shaped metal sector wires 26, which are positioned adjacent one another to form a tube-like structure. Metal sector wires 26 surrounding the unitary fiber core structure preferably are formed of high tension steel wires which, as noted supra, is preferred from a standpoint of resistance to creep. Also, the geometry of sector wires 26 provide substantially enhanced crush resistance since a crushing force at one location will be transferred around the entire periphery of the tube-like structure. Sector wires 26 are dimensioned so that the inside "wall" is spaced from the periphery of the unitary fiber core structure 12a whereby to leave a gap 28 which may be left free, or may be filled, for example with a water blocking compound. The assembly including the shaped sector wires 26 is then surrounded by an aluminum tube 30 which in turn is surrounded by a plurality of helically wound aluminum and/or aluminum-clad steel wires 32, i.e. as in the FIG. 1 embodiment.

Figure 4:
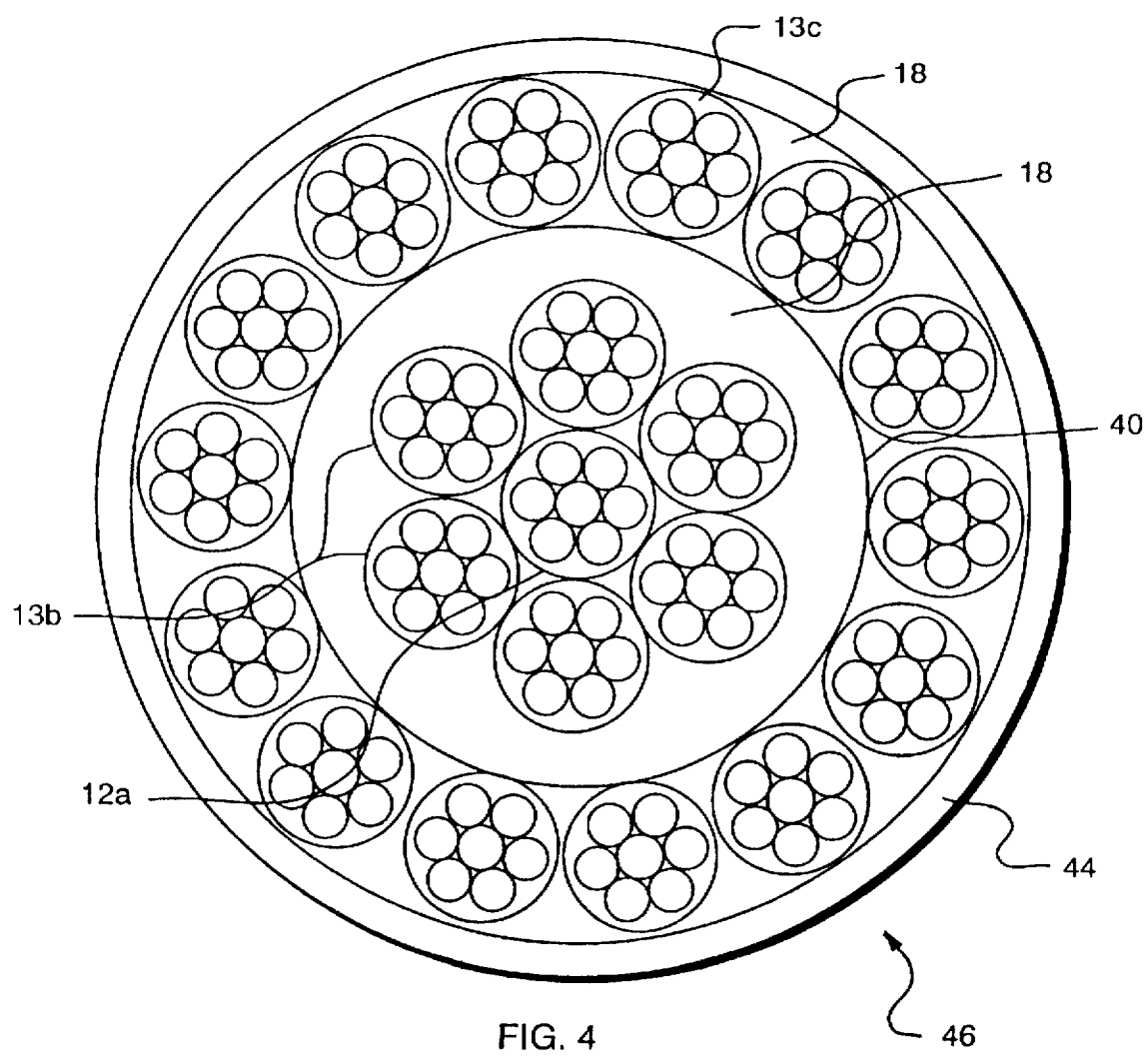
FIG. 4 is a view, similar to FIG. 2, and illustrating details of the central portion of a fiber optic cable constructed in accordance with yet another embodiment of the present invention.
Figure 5:
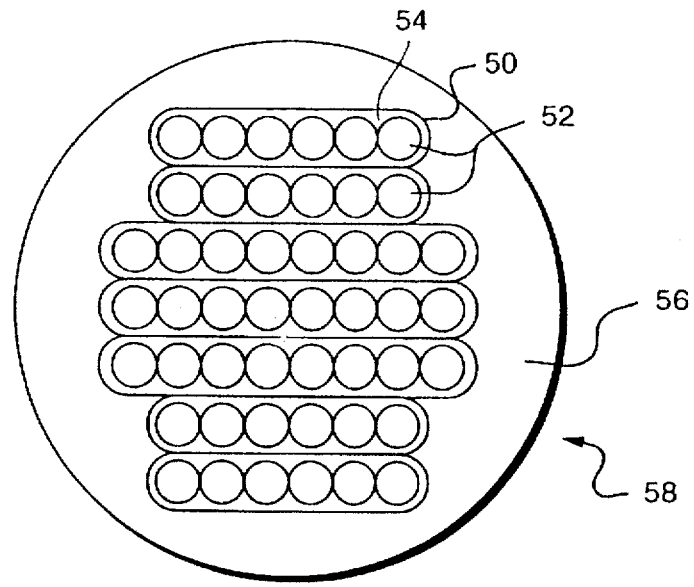
FIG. 5 is a cross-sectional view, similar to FIG. 4, showing details of the central portion of a fiber optic cable constructed in accordance with yet another embodiment of the present invention.

FIG. 4 shows yet another embodiment of the invention and comprising a central core assembly which includes a central seven-fiber-containing mini-bundle 13a surrounded by six like mini-bundles 13b and bonded together by a UV-curable acrylate material 18 whereby to form a first unitary fiber core structure 40. The first unitary fiber core structure is surrounded by fourteen more seven-fiber mini-bundles 13c which are arranged around the circumference, and bound together by a UV-curable acrylate material 18. The latter in turn is surrounded by UV-curable acrylate 44. The resulting unitary fiber structure 46 in turn is surrounded by high tension and crush resistance elements (not shown) in known manner, e.g. as in FIGS. 1-3. The invention above described is susceptible to modification. For example, as shown in FIG. 5, the optical fiber mini-bundles 50 may be formed as ribbon-like members, each comprising a plurality of optical fibers 52 bound together by a first curable material 54. A plurality of mini-bundles may be arranged in a stack and bound together by means of a second curable material 56 (which may be the same or different from the first curable material 54) whereby to form a unitary fiber structure 58. For example, as shown in FIG. 5, the unitary fiber structure comprises a stack of seven ribbon-like mini-bundles 50, four of which ribbons contain six optical fibers 52 while three ribbons 50 contain eight optical fibers 52 yielding a unitary fiber structure comprising forty-eight optical fibers. The resulting unitary fiber structure 58 in turn is surrounded by high tension and crush resistance elements (not shown) in known manner, e.g. as in FIG. 1-3.

Figure 6:
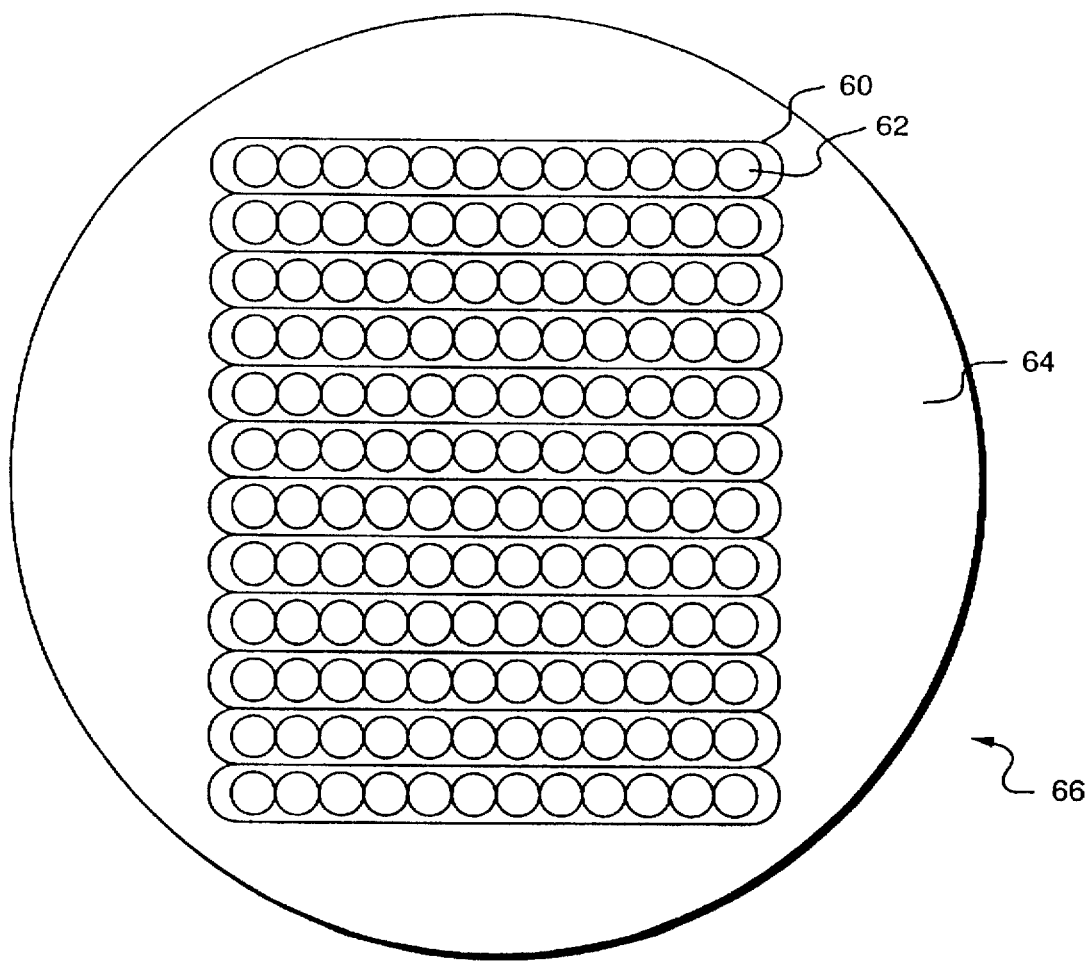
FIG. 6 is a view similar to FIG. 5 showing details of the central portion of a fiber optic cable constructed in accordance with still yet another embodiment of the present invention.

Yet another embodiment is shown in FIG. 6 wherein twelve mini-bundles 60 of twelve fibers 62 each are arranged in a stack, and encapsulated in a curable material 64 11 whereby to form a unitary fiber structure core 66 comprising 144 fibers. The resulting structure 66 in turn is surrounded by high tension and crush resistance elements (not shown) in known manner, e.g. as in FIGS. 1-3.

Figure 7:
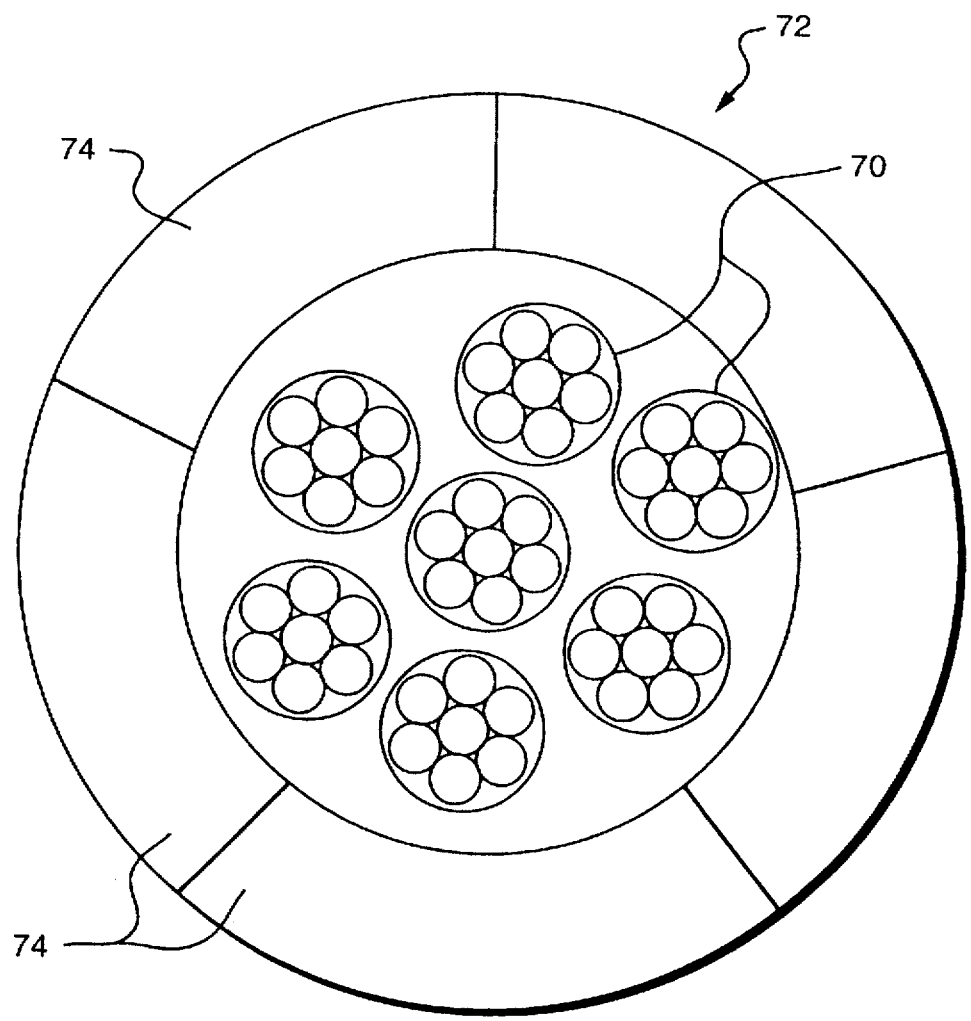
FIG. 7 is a view, similar to FIG. 3, and illustrating yet another alternative embodiment of fiber optic cable constructed in accordance with the present invention.

Various changes may be made in the above invention without departing from the spirit and scope thereof. For example, other mini-bundle shapes and fiber counts may be employed for forming the unitary fiber structure core. Also, it is not necessary to bond the mini-bundles to one another and/or to their surrounding metal sheath. Thus, for example, as shown in FIG. 7, one or a plurality of fiber optic mini-bundles 70 may be loosely laid within a metal tube 72, such as formed of a plurality of shaped metal sector wires 74.

The present invention has been described in relation to particular embodiments which are intended in all respects to be illustrative rather than restrictive. Thus, various changes and modifications may be made without departing from the spirit and scope of the invention.

We claim:

1. A high strength waterproof fiber optic cable assembly comprising a core structure comprising a plurality of fiber optic mini-bundles, each consisting of a plurality of optical fibers bonded together in a first curable material, said plurality of fiber optic mini-bundles being bonded together as a unitary structure by a second curable material, high-tension metal strength members surrounding said core structure, and a metal tube surrounding and hermetically sealing said high-tension metal strength member.

2. A fiber optic cable assembly of claim 1, wherein said mini-bundles comprise a plurality of optical fibers arranged as a ribbon.

3. A fiber optic cable assembly of claim 1, wherein at least one of said mini-bundles comprise a first central fiber surrounded by a plurality of circumferentially disposed fibers.

4. A fiber optic cable wire assembly of claim 1, wherein said plurality of optical fibers are disposed in a cloverleaf.

5. A fiber optic cable wire assembly of claim 1, wherein said curable material comprises a cross-linking material.

6. A fiber optic cable wire assembly of claim 1, wherein said curable material comprises a UV-curable material.

7. A fiber optic cable core assembly of claim 1, wherein said first and said second curable materials comprise the same material.

8. A fiber optic cable assembly of claim 1, wherein at least some of said fiber optic mini-bundles each comprise at least three optical fibers.

9. A fiber optic cable assembly of claim 1, wherein at least some of said fiber optic mini-bundles each comprise at least four optical fibers.

10. A fiber optic cable assemble of claim 1, wherein at least some of said fiber optic mini-bundles each comprise at least seven optical fibers.

11. A fiber optic cable assembly of claim 1, wherein said high-tension metal strength members comprise a plurality of metal wires, in a tube like ring configuration.

12. A fiber optic cable assembly of claim 11, wherein said metal wires are arranged in a plurality of layers.

13. A fiber optic cable assembly of claim 11, wherein said metal wires comprise wires of varying diameter.

14. A fiber optic cable assembly of claim 11, wherein said metal wires comprise a plurality of sector wires which together form a tube-like ring.

15. A high strength, waterproof, fiber optic cable assembly comprising a plurality of fiber optic mini-bundles, each comprising a plurality of optical fibers bonded together in a first curable material, and surrounded by a plurality of high-tension strength metal wires, which together form a tube-like ring and a metal tube surrounding and hermetically sealing said plurality of metal wires.

16. A fiber optic cable assembly of claim 15, wherein said metal wires are arranged in a plurality of layers.

17. A fiber optic cable assembly of claim 15, wherein said metal wires comprise wires of varying diameter.

18. A fiber optic cable assembly of claim 15, wherein said metal wires comprise a plurality of sector wires which together form a tube-like ring.

19. A fiber optic cable assembly of claim 11, wherein said metal wires comprise aluminum wires.

20. A fiber optic cable assembly of claim 11, wherein said metal wires comprise steel wires.

21. A high strength, waterproof, fiber optic cable assembly, comprising an optical fiber core comprising a plurality of fiber optic mini-bundles bonded together as a unity structure, surrounded by a plurality of shaped metal sector wires formed of high tension metal which together form a tube-like ring, and a metal tube surrounding and hermetically sealing said shaped metal sector wires.

22. A fiber optic cable assembly of claim 21, wherein said sector wires comprise high tension steel wires.

23. A fiber optic cable assembly of claim 1, wherein said high-tension, metal strength members comprise high tension steel wires.

24. A fiber optic cable assembly of claim 1, wherein said metal tube comprises copper.

25. A fiber optic cable assembly according to claim 1, wherein said fiber optic mini-bundles comprise a plurality of optical fibers arranged as a flat ribbon.

26. A fiber optic cable assembly according to claim 25, and comprising a stack of said mini-bundles arranged in ribbon form.

27. A fiber optic cable assembly of claim 15, wherein said high-tension, metal strength members comprise high tension steel wires.

28. A fiber optic cable assembly of claim 15, wherein said metal tube comprises copper.

29. A fiber optic cable assembly according to claim 15, wherein said fiber optic mini-bundles comprise a plurality of optical fibers arranged as a flat ribbon.

30. A fiber optic cable assembly according to claim 29, and comprising a stack of said mini-bundles arranged in ribbon form.

31. A fiber optic cable assembly of claim 21, wherein said shaped metal sector wires comprise high tension steel wires.

32. A fiber optic cable assembly of claim 21, wherein said metal tube comprises copper.

33. A fiber optic cable assembly according to claim 21, wherein said fiber optic mini-bundles comprise a plurality of optical fibers arranged as a flat ribbon.

34. A fiber optic cable assembly according to claim 33, and comprising a stack of said mini-bundles arranged in ribbon form.

* * * * *

UNITED STATES PATENT AND TRADEMARK OFFICE
CERTIFICATE OF CORRECTION

PATENT NO. : 5,787,217
DATED : July 28, 1998
INVENTOR(S) : Traut et al

It is certified that error appears in the above-identified patent and that said Letters Patent is hereby corrected as shown below:

Claim 1, Col. 6, line 7, insert a - -,- - after "strength" and after "waterproof".

Claim 15, Col. 6, line 55, insert a - -,- - after "ring".

Signed and Sealed this

Second Day of November, 1999

Attest:

Q. TODD DICKINSON

Attesting Officer

Acting Commissioner of Patents and Trademarks